United States Patent [19]
Gutteridge et al.

[11] Patent Number: 5,181,156
[45] Date of Patent: Jan. 19, 1993

[54] MICROMACHINED CAPACITOR STRUCTURE AND METHOD FOR MAKING

[75] Inventors: Ronald J. Gutteridge; Ljubisa Ristic, both of Paradise Valley, Ariz.

[73] Assignee: Motorola Inc., Schaumburg, Ill.

[21] Appl. No.: 883,324

[22] Filed: May 14, 1992

[51] Int. Cl.⁵ .................... H01G 7/00; G01P 15/08
[52] U.S. Cl. .................... 361/283; 73/517 R
[58] Field of Search ............. 361/283; 73/718, 724, 73/517

[56] References Cited
U.S. PATENT DOCUMENTS
4,882,933 11/1989 Petersen et al. ............. 73/517 R Primary Examiner—Donald A. Griffin
Attorney, Agent, or Firm—Stuart T. Langley

[57] ABSTRACT

A micromachined capacitor structure having integral travel stops (19, 22, 22') within an active region of the capacitor is provided. The capacitor structure is formed on a substrate (11) and includes a moving capacitor plate (15) supported by one or more flexing arms (17) mechanically anchored to the substrate (11). The moving capacitor plate (15) has an active region (15) substantially parallel to the substrate (11) and separated from the substrate (11) by a first spacing. A corrugation (19) is formed in the moving capacitor plate (15) over the substrate (11) and separated from the substrate (11) by a second spacing, wherein the second spacing is smaller than the first spacing.

18 Claims, 4 Drawing Sheets

MICROMACHINED CAPACITOR STRUCTURE AND METHOD FOR MAKING

BACKGROUND OF THE INVENTION

The present invention relates, in general, to solid state sensors, and more particularly, to solid state sensors having a micromachined capacitor structure.

Many micromachined devices are now well known, including force, acceleration, and pressure sensors. The term "micromachined" is used because the devices employ mechanical structures and spacings which are as small as a few tenths of a micrometer. The small dimensions are achieved by photolithographic and etching techniques similar to that used in integrated circuit manufacturing. Usually, many devices are manufactured on a single substrate. Often, a silicon substrate is used.

Most often, micromachined sensors use piezoresistive properties of silicon to generate a signal. Alternatively, capacitor plates can be formed on the substrate so that at least one capacitor plate can move with respect to another capacitor plate. The relative movement in response to pressure or acceleration changes the capacitance of the structure. This change in capacitance is detected as an output signal.

Unfortunately, prior micromachined capacitor structures suffer from a number of limitations which raise the cost of manufacture, limit accuracy, and preclude their use in many applications. For example, the moving capacitor plate can easily be distorted by residual stress incorporated during manufacture or from wear during extreme shock. Because the spacing between the capacitor plates is in the order of micrometers, these distortions often led to capacitor plates touching during operation, risking permanent damage. Also, capacitive structures have been developed having dynamic closed loop control systems to accurately position the movable or dynamic capacitor plate with respect to fixed capacitor plates. Closed loop systems only work well when movement of the dynamic capacitor plate is constrained within a narrow range.

Prior capacitor structures were usually designed as cantilevers with one end anchored to a substrate and another end free to swing in relation to a fixed capacitor plate. Because the free end of the cantilever structure swings more as the movable capacitor plate becomes larger, designs in which the swing distance was unconstrained had to have small capacitor plates. The smaller capacitor plate in turn lowers sensitivity of the device, precluding use in sensitive circuits.

What is needed is a micromachined capacitor structure and method for making it which provides travel limits on the dynamic capacitor plate to prevent electrical latching or mechanical damage during extreme shock.

SUMMARY OF THE INVENTION

Briefly stated, the present invention is achieved by a micromachined capacitor structure having integral travel stops within an active region of the capacitor. The capacitor structure is formed on a substrate and includes a movable capacitor plate formed as a cantilever structure or suspended by multiple arms that are mechanically anchored to the substrate. The moving capacitor plate has an active region substantially parallel to the substrate and separated from the substrate by a first spacing. A corrugation is formed in the moving capacitor plate over the substrate and separated from the substrate by a second spacing, wherein the second spacing is smaller than the first spacing.

Figure 1:
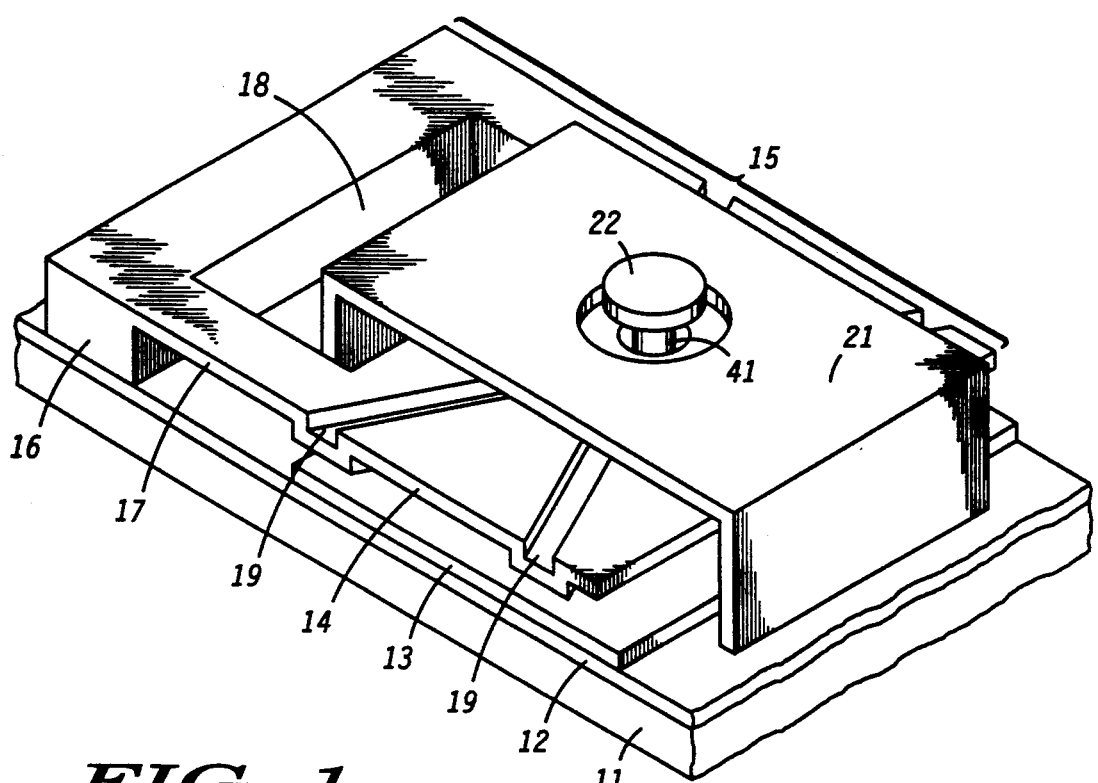
FIG. 1 is a highly simplified perspective view of a micromachined capacitor structure in accordance with the present invention.
Figure 2:
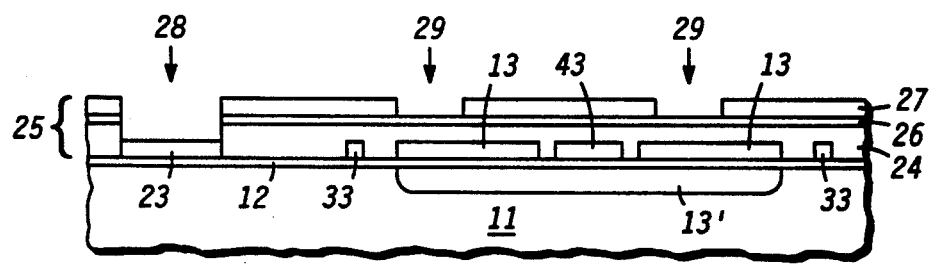
Figure 3:
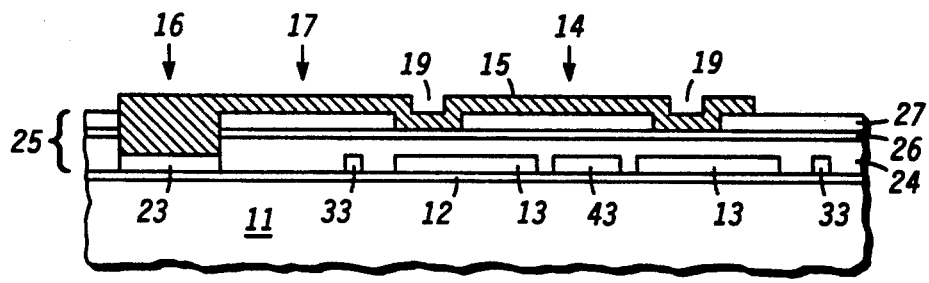
Figure 4:
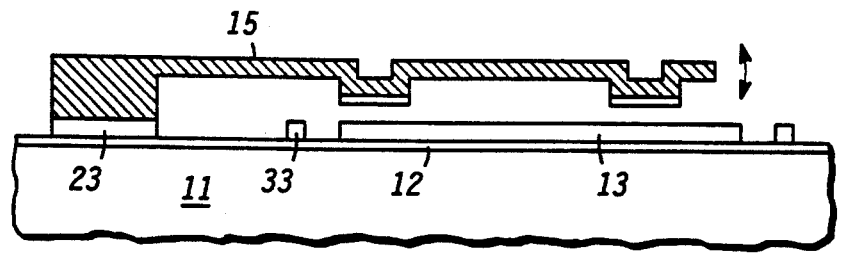
Figure 5:
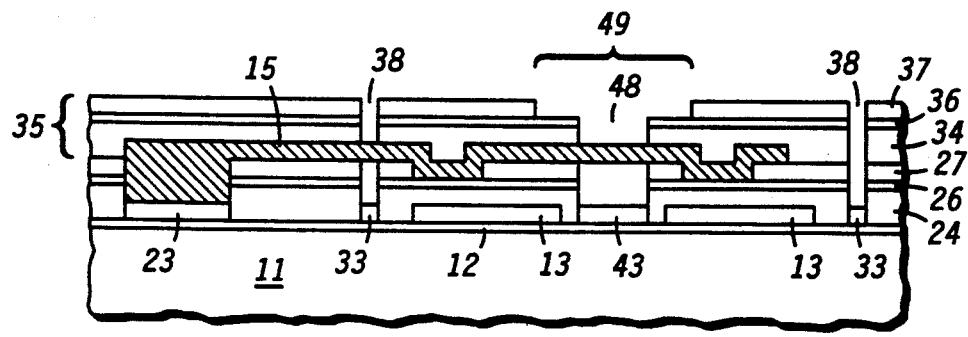
Figure 6:
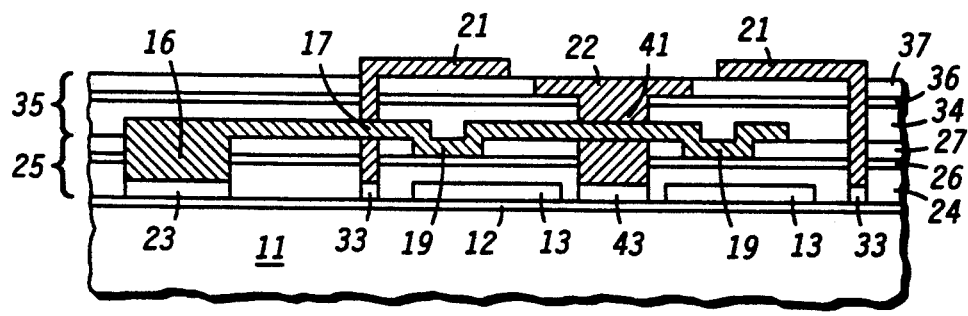
Figure 7:
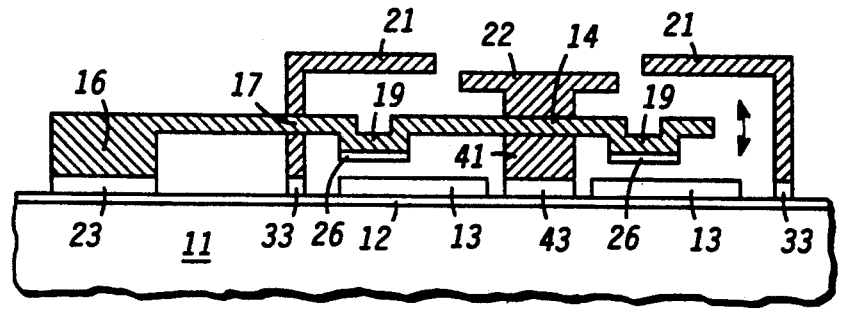
Figure 8:
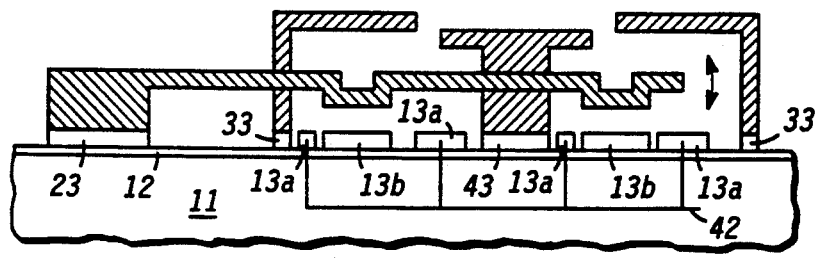
Figure 9:
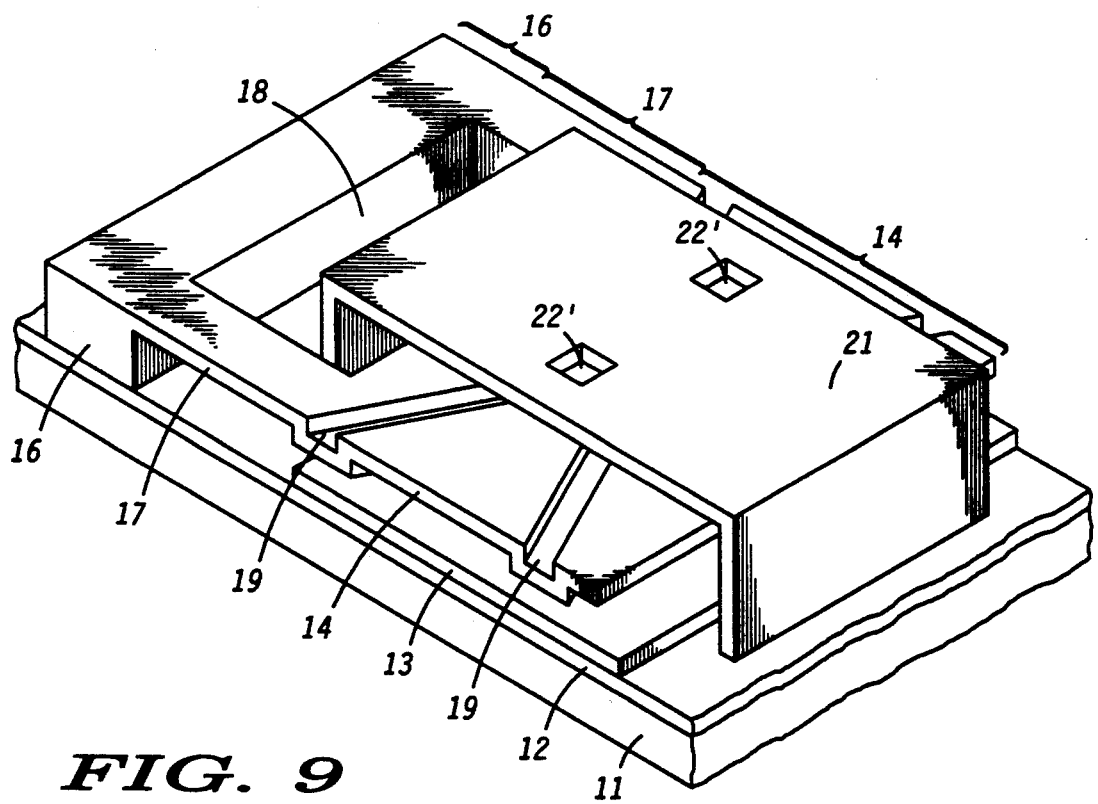
Figure 10:
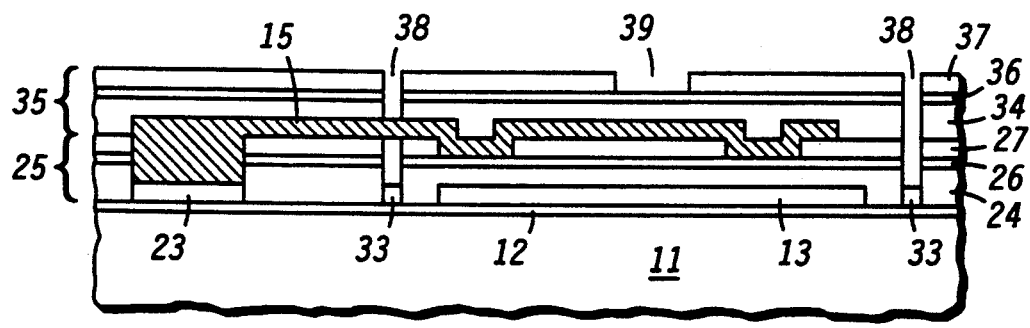
Figure 11:
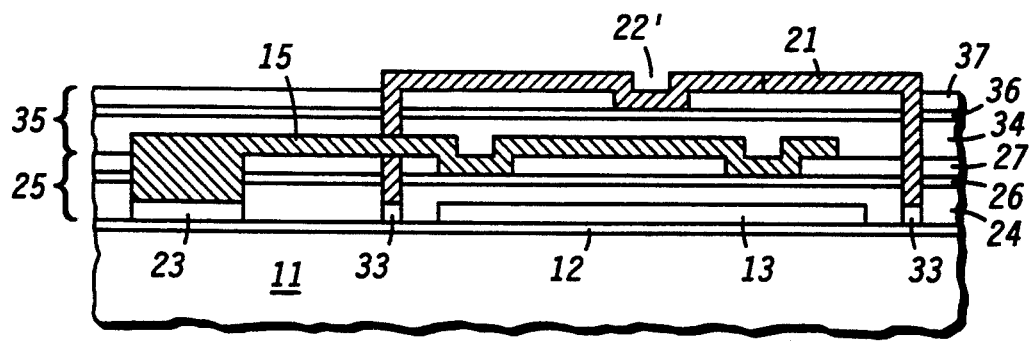
Figure 12:
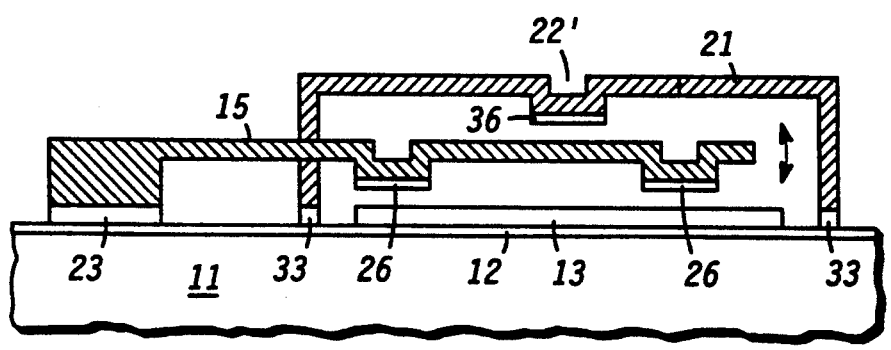

FIG, 2 is a cross-section view of the structure shown in FIG. 1 at an early stage of processing;

FIG. 3 is a cross-section view of the structure in FIGS. 1-2 further along in processing;

FIG. 4 is a cross-section view of a first embodiment structure in accordance with the present invention;

FIG. 5 is a cross-section of the structure shown in FIGS. 1-3 at a still later stage of processing;

FIG. 6 is a cross-section of the structure shown in FIGS. 5 at a still later stage of processing;

FIG. 7 is a cross-section view of a structure shown in FIG. 5 at a final stage in processing;

FIG. 8 is a cross-section view illustrating an alternative embodiment in accordance with the present invention;

FIG. 9 is highly simplified perspective view of an alternative embodiment micromachined capacitor structure in accordance with the present invention;

FIG. 10 is a cross-section view of the structure shown in FIG. 9 at an early stage of processing;

FIG. 11 is a cross-section view of the structure shown in FIGS. 9-10 at a later stage of processing; and FIG. 12 is a cross-section view of the structure shown in FIGS. 9-11 at a final stage of processing.

DETAILED DESCRIPTION OF THE DRAWINGS

The present invention involves a travel stop which is formed as an integral part of an active area of a micromachined capacitor structure. For a cantilever structure it is possible to form travel stops external to the active area, in other words spaced away from the active area. However, external travel stops are less effective because distortions in a flexible capacitor plate may allow the active areas of the capacitor plate to come into contact before the external travel stop is effective. It is not feasible to completely eliminate the distortions, or to individually tailor the shape and position of the external travel stop to account for the distortions. Where the movable capacitor plate is suspended by multiple arms, external travel stops are more difficult and often impossible to manufacture. In any case, it is preferable to form the travel stop in or very near to the active area of the capacitor plate, thereby ensuring that the active area will not contact the active area of another capacitor plate.

FIG. 1 is a highly simplified perspective view of a micromachined capacitor structure in accordance with the present invention. Substrate 11 is conveniently a semiconductor wafer comprising silicon, although any mechanically supporting substrate is acceptable. The substrate may optionally be coated with one or more dielectric layers, such as dielectric layer 12 shown in FIG. 1 to protect the surface of substrate 11. In a preferred embodiment dielectric layer 12 comprises approximately 0.3 micrometers of silicon nitride deposited by low pressure chemical vapor deposition.

A lower capacitor plate 13 is formed on dielectric layer 12. In a preferred embodiment, polysilicon is deposited on dielectric layer 12 as a blanket layer and patterned to form capacitor plate 13. A middle or moving capacitor plate 15 is formed as a cantilever structure having an active region 14 positioned over lower capacitor plate 13. Moving capacitor plate 15 is mechanically attached to substrate 11 by anchor portion 16. Active region 14 is attached to anchor portion 14 by flexure portion 17. Flexure portion 17 is a flexing arm which supports moving capacitor plate 15. One or more flexing arms can be used to support moving capacitor plate 15. In a preferred embodiment a window 18 is formed in flexure portion 17 to increase flexibility of the structure, and to allow upper capacitor plate 21 to be anchored to substrate 11. Electrical contact is made to lower capacitor plate 13, moving capacitor plate 15, and upper capacitor plate 21 using any of a number of well known techniques for contacting semiconductor device elements, and so is not shown or described in detail here.

An important feature of the present invention is corrugations 19 formed in active area 14 which increase rigidity of active area 14, facilitate drying after wet chemical etching during processing, and provide travel stops for active area 14. Corrugations 19 are desirably positioned to radiate from a central portion of active area 14 towards the edge of active area 14. This radiating pattern increases rigidity of active area 14 in two dimensions. Alternatively, other arrangements of corrugations 19 are possible to tailor rigidity of active area 14 to any desired characteristic. The formation and function of corrugations 19 are described in greater detail in reference to the other figures. If increased rigidity is not required, corrugations 19 can be formed as dimples that act as internal travel stops and facilitate drying after wet chemical etching during processing.

An upper capacitor plate 21 is formed over active area 14 of moving capacitor plate 15. Conveniently, upper capacitor plate 21 is anchored to substrate 11 through window 18 in moving capacitor plate 15. Upper capacitor plate 21 is also anchored on at least one other side, as shown at the far right hand side of FIG. 1, so that upper plate 21 remains in a fixed position when the device is accelerated. While it is possible to produce an accelerometer without an upper capacitor plate 21, upper capacitor plate 21 allows the sensor to produce a differential capacitance signal in response to acceleration. For example, an acceleration which forces active area down with respect to upper plate 21 and lower plate 13 will result in both an increase in the measured capacitance between moving capacitor plate 15 and lower plate 13 and a decrease in capacitance between the moving capacitor plate and upper plate 21. The differential capacitor structure is thus more sensitive and accurate.

In the embodiment illustrated in FIG. 1 an upper travel stop 22 is detached from upper capacitor plate 21 and is anchored to substrate 11 by a post 41 which passes through a hole in active area 14. Upper travel stop 22 has a larger diameter than the hole in active area 14, and thus serves to stop upward vertical motion of active area 14. To simplify illustration and understanding, several optional features of the present invention are not illustrated in FIG. 1, but instead are described in detail in the subsequent drawings.

FIGS. 2-7 illustrate a cross-section views taken through the dashed line shown in FIG. 1 at various stages of processing. FIG. 2 shows the structure of FIG. 1 at an early stage of processing. Substrate 11 is optionally coated with dielectric layer 12. Dielectric layer 12 is coated with polysilicon and the polysilicon is patterned to provide lower capacitor plate 13. Optionally, lower capacitor plate 13 can be replaced by a diffused capacitor plate 13', comprising a doped region formed in substrate 11. For ease of description, the preferred embodiments are described using only a polysilicon capacitor plate 13, but it should be understood that a diffused capacitor plate 13' is an acceptable design choice.

A number of anchors 23, 33, and 43 are preferably provided during the patterning step for later use as attaching points for overlying capacitor plates. Anchor 23, lower plate 13, and any dielectric 12 exposed during the patterning step are covered by a sacrificial layer 25. In one embodiment, sacrificial layer 25 comprises multiple layers including a first sacrificial dielectric 24 such as silicon oxide which is about 1.0 micrometers thick, coated with a plasma enhanced chemical vapor deposited (PECVD) silicon nitride layer 26 which is about 0.3 micrometer thick, which is coated with a second sacrificial dielectric layer 27 comprising about 1.0 micrometers of silicon oxide. In another embodiment, sacrificial layer 25 is a homogeneous layer approximately 2.0 microns thick comprising a material, such as silicon oxide, which can be etched preferentially with respect to capacitor plates 13, 15, and 21 shown in FIG. 1.

Material compositions of layers 24, 26, and 27 are selected so that first and second sacrificial dielectrics 27 can be selectively etched with respect to layer 26. When silicon oxide and silicon nitride are used as described, a buffered hydrofluoric acid solution will etch silicon oxide much faster than silicon nitride. Layer 26 can thus serve as an etch stop layer in subsequent steps. Specified thicknesses for layers 24, 26, and 27 are representative only, and can vary widely according to the demands of a particular application while achieving the advantages of the present invention.

A first window or hole 28 is made in second sacrificial dielectric 27 over anchor 23. After an initial etch, holes 28 extend partially through first sacrificial layer 25. In practice, a plurality of holes 28 may be opened over each anchor 23 used in the device, although to ease illustration only a single hole 28 is shown. A second set of windows or holes 29 are made in second sacrificial dielectric 27 away from first hole 28 and lower capacitor plate 13. Holes 29 also extend partially through sacrificial layer 25 and are advantageously etched simultaneously with the initial etch of holes 28. Silicon nitride layer 26 provides an etch stop, allowing precise control of the depth of holes 29. If silicon nitride layer 26 is not used, or whenever sacrificial layer 25 is formed as a single homogeneous layer, a timed etch should be used to provide holes 29. Subsequently, holes 29 are protected by photoresist or the like, and holes 28 are further etched to expose anchors 23.

FIG. 3 illustrates the structure shown in FIG. 2 further along in processing. After anchors 23 are exposed, polysilicon is deposited to fill holes 28 and 29, and to cover second sacrificial dielectric 27. The polysilicon is patterned and etched to define the features of moving capacitor plate 15, including anchor portion 16, flexure portion 17 and active area 14. The polysilicon filling holes 28 forms anchor portion 16 and mechanically attaches to substrate 11 either directly, or through anchors 23. The polysilicon filling holes 29 covers the exposed portion of layer 26, and forms corrugations 19. Movable capacitor plate 15 may be made of other conductive or semiconductive materials, but polysilicon proves to be a rugged, easily processed material.

A simple capacitor structure can be completed at this stage by removing sacrificial layer 25 by isotropic etching. Preferably, this isotropic etch step uses an etchant which etches layers 24 and 27 faster than layer 26. For example, a buffered hydrofluoric acid solution is acceptable when layers 24 and 27 comprise silicon oxide and layer 26 comprises silicon nitride. This step is also referred to as a "sacrificial etch." The sacrificial etch removes substantially all of sacrificial layers 24 and 17. Once sacrificial layers 24 and 27 are gone, the etchant can attack layer 26 from both the top and the bottom in the areas under active area 14 and flexure 17. However, in the area under corrugation 19, the etchant can only attach layer 26 from the bottom. Thus, the portion of layer 26 protected by corrugation 19 is attacked at approximately one-half the rate of the remainder of layer 26. The sacrificial etch is timed to remove all of layer 26 except for the portion covered by corrugation 19.

Alternatively, silicon nitride layer 26 can be patterned immediately after deposition so that only portions witch will eventually be directly under corrugation 19 remain. If this process is used, the sacrificial etch step is somewhat simpler, although an additional patterning and etch step is required earlier. Selection between these two processes is guided by cost and particular process capabilities of the manufacturer.

The resulting moving capacitor plate 15, shown in FIG. 4, includes active area 14, a corrugation 19 for each hole 29 (shown in FIG. 2), flexure portions 17, and anchor portions 16 for each hole 28 (shown in FIG. 2). Active area 14 is separated from lower capacitor plate 13 by the thickness of the first and second sacrificial layers together with the thickness of layer 26. The bottom surface of corrugation 19 forms a travel stop and is separated from the lower capacitor plate by the thickness of first sacrificial layer 24. Moving capacitor plate 15 is free to move up and down as indicated by arrows in FIG. 4. Downward motion of the moving capacitor plate is checked by the travel stop formed by the lower surface of corrugation 19 so that active area 14 cannot make mechanical or electrical contact to lower capacitor plate 13.

It is desirable to form an upper capacitor plate 21 as shown in FIG. 1. The process steps required to form upper capacitor plate 21 are described in reference to the cross-sections shown in FIGS. 5-7. The process steps illustrated in FIGS. 5-7 are intended to be performed before the sacrificial etch, and so build on the structure shown in FIG. 3. After the the polysilicon layer is patterned to form moving capacitor plate 15 and before the sacrificial etch step, the structure is coated with a second sacrificial layer 35. Like first sacrificial layer 25, second sacrificial layer 35 preferably comprises multiple layers of dielectric. In a specific example, second sacrificial layer 35 comprises third silicon oxide layer 34 covered by silicon nitride layer 36 which is in turn covered by fourth silicon oxide layer 37. Thickness of each of the layers is chosen to achieve desired spacings between upper capacitor plate 21 and moving capacitor plate 15.

Second sacrificial layer 35 is patterned and etched in a manner that is analogous to the etching of sacrificial layer 25 set out hereinbefore. A first hole or set of holes 38 is etched completely through second sacrificial layer 35 to expose anchors 33. Holes 48 extend through second sacrificial dielectric 35, moving capacitor plate 15 and first sacrificial layer 25 to expose anchors 43. As a practical matter, a hole will be previously etched in moving capacitor plate 15 when that structure is patterned, and holes 48 will be aligned to the hole previously opened in moving capacitor plate 15. Holes 49 are concentric with holes 48, and somewhat larger, and may be circular or ring shaped openings in practice. Holes 49 are etched partially through second sacrificial layer 35, in a similar manner to holes 29 described hereinbefore.

Anchor 33 may simply be a predetermined location on the surface of substrate 11. Alternatively, anchor 33 comprises one or more layers of polysilicon which are desirably formed at the same time as anchor 23, and may be covered with an additional polysilicon layer during the pattering of the moving capacitor plate. To ensure that upper capacitor plate 21 is substantially immobile with respect to the moving capacitor plate, upper capacitor plate 21 should be anchored to substrate 11 on at least two sides. As illustrated in FIG. 7, upper capacitor plate 21 may have one anchor 33 that passes through the moving capacitor plate, as shown in FIG. 1 and FIG. 2. Alternatively, upper capacitor plate 21 may be anchored at two locations outside the periphery of the moving capacitor plate.

A blanket layer of polysilicon is deposited to cover second sacrificial layer 35 and to fill holes 38, 48, and 49, as shown in FIG. 6. Upper capacitor plate 21 may be made of other conductive or semiconductive materials, but polysilicon proves to be a rugged, easily processed material. Upper capacitor plate 21 patterned using conventional photolithography and etching processes. The blanket layer of polysilicon is patterned to form upper capacitor plate 21 anchored to substrate 11 by post 41. Upper travel stop 22 extends over a portion of the moving capacitor plate. In this embodiment, a ring shaped portion of upper capacitor plate 21 is removed during the patterning step to leave upper travel stop 22, which is electrically and mechanically isolated from upper capacitor plate 21 and the moving capacitor plate. After upper capacitor plate 21 is patterned, the entire structure is processed through a sacrificial etch, described hereinbefore, to remove sacrificial layers 25 and 35, resulting in the structure shown in FIG. 7.

It is apparent in FIG. 7 that active area 14 of moving capacitor plate 15 can swing in a vertical direction between lower plate 13 and upper plate 21. Corrugations 19 have a bottom surface which is over a portion of lower plate 13. Downward motion of active area 14 is checked when the bottom surface of corrugations 19 contacts lower plate 14 at a portion of lower plate referred to hereinafter as a "landing pad." Similarly, upward motion of active area 14 is checked when an upper surface of active area 14 contacts upper travel stop 22. In this manner, the flexible capacitor plate is constrained to prevent damage during extreme shock.

A preferred alternative structure is shown in FIG. 8. This embodiment differs from the structure shown in FIG. 7 primarily in that lower capacitor plate 13 is patterned to isolate landing pads 13b from lower capacitor plate 13a. The various portions of capacitor plate 13a are electrically interconnected, as suggested by interconnect 42 shown schematically in FIG. 8. Because landing pads 13b are electrically isolated from capacitor plate 13a, there is no need for a dielectric coating on the bottom surface of corrugations 19. Thus, silicon nitride layer 26, shown in FIGS. 2-7, can be eliminated. Even where silicon nitride layer 26 is used, it is not necessary to carefully time the sacrificial etch to preserve nitride layer 26 on the bottom surface of corrugations 19. For these reasons the structure shown in FIG. 8 is believed to be more manufacturable and robust than the structure shown in FIG. 7.

An alternative method for forming upper travel stops is illustrated in FIGS. 9-12. FIG. 9 shows a highly simplified perspective view differing from FIG. 1 in the form of upper capacitor plate 21 and travel stops 22'. In this embodiment, upper travel stops 22' are formed in a manner similar to that used to form corrugations 19, described in reference to FIGS. 2-4. The process steps illustrated in FIGS. 9-12 build on the structure shown in FIG. 3.

FIG. 10 shows a cross-section of the structure shown in FIG. 9 at an early stage in processing, after deposition and patterning of second sacrificial layer 35. A first set of holes 38 are etched completely through second sacrificial layer 35 and first sacrificial layer 25 to expose anchors 33. A second set of holes 39 are etched partially through sacrificial layer 35. Where a silicon nitride layer 36 is used, second set of holes 39 expose portions of layer 36, and layer 36 is used as an etch stop to precisely control the depth of holes 39.

Second sacrificial layer 35 is covered by, and holes 38 and 39 are filled by, a blanket polysilicon layer which is patterned to form upper capacitor plate 21 as shown in FIG. 11. The portion of upper capacitor plate 21 that fills holes 38 anchors upper capacitor plate 21 to substrate 11. The portion of upper capacitor plate 21 that fills holes 39 forms a corrugation which serves as upper travel stop 22'. The entire structure is processed through the sacrificial etch step described hereinbefore to remove sacrificial layers 25 and 35, as shown in FIG. 12.

An important feature of the structure shown in FIG. 12 is that the travel stop formed by the bottom surface of corrugation 19 is electrically isolated by silicon nitride layer 26. Likewise, upper travel stop 22' is electrically isolated from moving capacitor plate 15 by silicon nitride layer 36. This feature ensures that the flexible capacitor plate will never electrically short to lower capacitor plate 13 or upper capacitor plate 21.

Arrows in FIG. 12 indicate that active area 14 can swing in a vertical direction between lower plate 13 and upper plate 21. Corrugations 19 have a bottom surface which is over a portion of lower plate 13. Downward motion of active area 14 is checked when the bottom surface of corrugations 19 contact lower plate 13. Similarly, upward motion of active area 14 is checked when an upper surface of active area 14 contacts upper travel stop 22'. In this manner, flexible capacitor plate 15 is constrained to prevent damage during extreme shock.

An important feature of all embodiments of the present invention is that very large area capacitor structures are possible. Large area capacitor structures are more sensitive and potentially more accurate than small area structures. By forming many travel stops integral with the active area of the capacitor plates, the capacitor plates can be made quite large without concern for deformations and bending which naturally occur in micromachined structures. The integral travel stops in accordance with the present invention prevent capacitor plate from touching during high acceleration and stress, which also contributes to larger capacitor area as well as higher reliability and longer mean time to failure.

By now it should be appreciated that a micromachined capacitor structure and method for making it is provided. The apparatus in accordance with the present invention provides travel stops which are integral to the active areas of a moving or dynamic capacitor structure, making the travel stops more reliable, functional, and robust. The method of the travel stops in accordance with the present invention combines widely available semiconductor processes to provide the micromachined structure.

We claim:

1. A method for forming travel limit stops in a micromachined capacitor structure comprising the steps of:

providing a substrate having a top surface; covering the top surface with a first silicon nitride layer;

forming a first polysilicon layer on the first silicon nitride layer, patterning the first polysilicon layer to form a first anchor and a lower capacitor plate, wherein portions of the first silicon nitride layer are exposed by the patterning step;

covering the first patterned polysilicon and the exposed portions of the first silicon nitride with a first sacrificial layer comprising silicon oxide;

covering the first sacrificial layer with a second silicon nitride layer;

covering the second silicon nitride layer with a second sacrificial layer comprising silicon oxide;

etching a first hole in the second sacrificial layer, the second silicon nitride, and the first sacrificial layer to expose the first anchor;

etching a second hole in the second sacrificial layer over the lower capacitor plate;

forming a second polysilicon layer that fills the first and second holes and covers the second sacrificial layer;

patterning the second polysilicon layer to form a middle capacitor plate that is mechanically attached to the anchor, has a portion spaced from the lower capacitor plate by the thickness of the first and second sacrificial layers together with the second silicon nitride layer, and a travel stop portion which is spaced from the lower capacitor plate by the thickness of the first sacrificial layer and the second silicon nitride layer; and performing a sacrificial etch of the first and second sacrificial layers using an isotropic etchant that etches the silicon oxide faster than silicon nitride, wherein only a portion of the second silicon nitride layer which is covered by the travel stop portion remains after the sacrificial etching.

2. The method of claim 1 wherein the step of patterning the first polysilicon layer also forms a second anchor, and the method further comprising the steps of: before the sacrificial etching step, covering the middle capacitor plate with a third sacrificial layer comprising silicon oxide;

covering the third sacrificial layer with a third silicon nitride layer;

covering the third silicon nitride layer with a fourth sacrificial layer comprising silicon oxide;

etching a third hole in the fourth sacrificial layer, the third silicon nitride, and the third sacrificial layer to expose the second anchor;

etching a fourth hole in the fourth sacrificial layer over the middle capacitor plate;

forming a third polysilicon layer that fills the third and fourth holes and covers the fourth sacrificial layer; and patterning the third polysilicon layer to form an upper capacitor plate that is mechanically attached to the second anchor, has a portion spaced from the middle capacitor plate by the thickness of the third and fourth sacrificial layers together with the third silicon nitride layer, and a travel stop portion which is spaced from the middle capacitor plate by the thickness of the third sacrificial layer and the third silicon nitride layer.

3. The method of claim 1 wherein the first sacrificial layer is approximately 1.0 micrometer thick, the second silicon nitride layer is approximately 0.3 micrometer thick, and the second sacrificial layer is approximately 1.0 micrometer thick.

4. The method of claim 1 wherein the portion of the second silicon nitride layer which remains after the sacrificial etching is approximately half of the original thickness of the second silicon nitride layer.

5. The method of claim 1 wherein the step of patterning the first polysilicon layer further comprises the step of forming a landing pad that is electrically isolated from the lower capacitor plate and the anchor, and the second hole is formed over the landing pad.

6. A method for forming travel limit stops in a micromachined capacitor structure comprising: providing a substrate having a top surface; forming a plurality of polysilicon anchors on the top surface; forming a lower capacitor plate on the top surface, wherein the lower capacitor plate has an active portion and a landing pad portion; covering the top surface, the anchors, and the lower capacitor plate with a sacrificial layer; etching a first set of holes extending through the sacrificial layer to expose the anchors; etching a second set of holes extending partially through the sacrificial layer and positioned over the landing pad portion of the lower capacitor plate; forming a middle polysilicon capacitor plate on the sacrificial layer and extending into the first and second sets of holes, wherein the middle capacitor plate is mechanically attached to at least one anchor through the first set of holes and has dimples where the capacitor plate extends into the second set of holes; and etching the sacrificial layer to provide an air gap between the capacitor plate and the substrate.

7. The method of claim 6 wherein the landing pads portions are electrically isolated from the anchors and the active portion of the lower capacitor plate.

8. The method of claim 6 wherein before the step of etching the sacrificial layer the method further comprises the steps of forming a second sacrificial layer covering the middle polysilicon capacitor plate and the anchors; etching a third set of holes extending through the second sacrificial layer to expose an anchor; etching a fourth set of holes extending partially through the second sacrificial layer, wherein each of the fourth set of holes surrounds one of the third set of holes and extends over the middle capacitor plate; forming an upper polysilicon capacitor plate mechanically attached to the anchor through the third set of holes and extending over the middle capacitor plate; and forming an upper travel stop comprising polysilicon attached to at least one of the anchors through the fourth set of holes, wherein the upper travel stop is electrically isolated from the upper capacitor plate, the middle capacitor plate, and the lower capacitor plate.

9. The method of claim 6 wherein before the step of etching the sacrificial layer the method further comprises the steps of forming a second sacrificial layer covering the middle polysilicon capacitor plate and the anchors; etching a third set of holes extending through the second sacrificial layer to expose an anchor; etching a fourth set of holes extending partially through the second sacrificial layer, wherein each of the fourth set of holes is positioned over the middle capacitor plate; forming an upper polysilicon capacitor plate mechanically attached to the anchor through the third set of holes and extending over the middle capacitor plate, wherein a portion of the upper capacitor plate extends into at least one of the fourth set of holes to to form an upper travel stop.

10. A micromachined capacitor structure having a travel limit stop, the structure comprising: a substrate; a moving capacitor plate having an active area separated from the substrate by a first spacing and mechanically attached to the substrate by at least one anchor region, wherein the active region is substantially parallel to the substrate; and a corrugation formed in the second capacitor plate, wherein the corrugation has a bottom surface located over the substrate and separated from the substrate by a second spacing, wherein the second spacing is smaller than the first spacing.

11. The micromachined capacitor structure having a travel limit stop of claim 10 further comprising a dielectric coating on the bottom surface of the corrugation.

12. The micromachined capacitor structure of claim 11 wherein the dielectric coating comprises silicon nitride.

13. The micromachined capacitor structure of claim 12 further comprising: an upper capacitor plate formed over the moving capacitor plate and separated from the moving capacitor plate by a third spacing and mechanically attached to the substrate; and a corrugation formed in the upper capacitor plate, wherein the corrugation has a bottom surface positioned over the moving capacitor plate and spaced from the moving capacitor plate by a fourth spacing, wherein the fourth spacing is smaller than the third spacing.

14. The micromachined capacitor structure of claim 12 further comprising: an upper capacitor plate formed over the moving capacitor plate and separated from the moving capacitor plate by a third spacing and mechanically attached to the substrate; and a polysilicon travel stop having a bottom surface positioned over the moving capacitor plate and spaced from the moving capacitor plate by a fourth spacing, wherein the fourth spacing is smaller than the third spacing and the polysilicon travel stop is electrically isolated from the lower, moving, and upper capacitor plates.

15. The micromachined capacitor structure of claim 11 further comprising a lower capacitor plate formed in or on the substrate beneath the active region of the moving capacitor wherein a portion of the lower capacitor plate located underneath the corrugation serves as a landing pad for the bottom surface of the corrugation.

16. The micromachined capacitor structure of claim 10 further comprising a lower capacitor plate formed in or on the substrate beneath the active region of the moving capacitor plate and a landing pad formed on the substrate underneath the corrugation.

17. A micromachined capacitor structure comprising: a substrate; a first capacitor plate formed on the substrate; a second capacitor plate supported by at least one flexing arm and having an active area formed over the first capacitor plate, an anchor area mechanically attached to the substrate and spaced away from and electrically isolated from the first capacitor plate, and a flexure portion mechanically coupling the active area to the anchor portion; and a plurality of corrugations formed in the active area of the second capacitor plate, wherein the corrugations make the active portion more rigid in at least one dimension than the flexure portion.

18. The micromachined capacitor structure of claim 17 wherein each corrugation extends radially from a center of the active area to an edge of the active area.

* * * * *